(12) United States Patent
Hashimoto et al.

(10) Patent No.: US 9,932,007 B2
(45) Date of Patent: Apr. 3, 2018

(54) ENERGY ABSORBING STRUCTURE OF VEHICLE

(71) Applicant: TOYOTA JIDOSHA KABUSHIKI KAISHA, Toyota-shi, Aichi-ken (JP)

(72) Inventors: Hiroki Hashimoto, Nisshin (JP); Shintaro Kitakata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/413,913

(22) Filed: Jan. 24, 2017

(65) Prior Publication Data

US 2018/0015896 A1 Jan. 18, 2018

(30) Foreign Application Priority Data

Jul. 12, 2016 (JP) .................. 2016-137842

(51) Int. Cl.
| | |
|---|---|
| *B60R 19/34* | (2006.01) |
| *B62D 27/02* | (2006.01) |
| *B62D 25/08* | (2006.01) |
| *B62D 29/04* | (2006.01) |
| *B62D 29/00* | (2006.01) |

(52) U.S. Cl.
CPC .............. *B60R 19/34* (2013.01); *B62D 25/08* (2013.01); *B62D 27/02* (2013.01); *B62D 29/008* (2013.01); *B62D 29/041* (2013.01)

(58) Field of Classification Search
CPC ... B60R 19/34; B60R 19/18; B60R 2019/186; B60R 19/00; B60R 19/04; B60R 19/24; B60R 19/36; B60R 2019/005; B62D 25/082; B62D 21/152; B62D 21/15; B62D 25/088

USPC .......... 296/133, 155, 115, 118, 205, 187.09; 293/117, 120, 132

See application file for complete search history.

(56) References Cited

U.S. PATENT DOCUMENTS

| | | | | |
|---|---|---|---|---|
| 5,340,178 | A * | 8/1994 | Stewart | .................... B60R 19/18 293/122 |
| 7,543,865 | B2 * | 6/2009 | Hodoya | .................. B60R 19/18 293/102 |
| 2008/0036225 | A1 * | 2/2008 | Ji | ............................ B60R 19/34 293/155 |

(Continued)

FOREIGN PATENT DOCUMENTS

| | | |
|---|---|---|
| EP | 2896535 A1 | 7/2015 |
| JP | 2015-182595 A | 10/2015 |
| JP | 2015-196463 A | 11/2015 |

(Continued)

*Primary Examiner* — D Glenn Dayoan
*Assistant Examiner* — Sunsurraye Westbrook
(74) *Attorney, Agent, or Firm* — Oliff PLC

(57) ABSTRACT

An energy absorbing structure of a vehicle of the present invention has: a bumper reinforcement positioned at a vehicle front end portion or a vehicle rear end portion, the bumper reinforcement extending in a vehicle transverse direction; and a crash box made of a fiber-reinforced resin, the crash box being disposed at a side opposite a side of input of collision load to the bumper reinforcement, and the crash box being structured to include a crash box main body having a closed cross-sectional structure. An upper portion and a lower portion of the crash box main body do not overlap the bumper reinforcement as seen from a vehicle longitudinal direction.

8 Claims, 5 Drawing Sheets

(56) References Cited

U.S. PATENT DOCUMENTS

2011/0049916 A1* 3/2011 Nakanishi ............... B60R 19/34
 293/133
2013/0300138 A1* 11/2013 Banasiak ................ B60R 19/34
 293/133

FOREIGN PATENT DOCUMENTS

JP   2016-010983 A   1/2016
WO   2015/145239 A1  10/2015

* cited by examiner

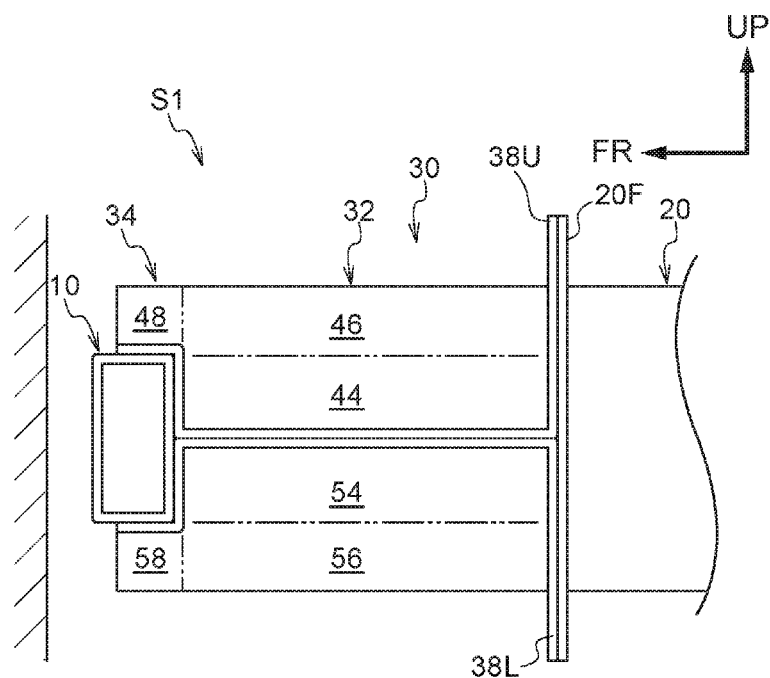
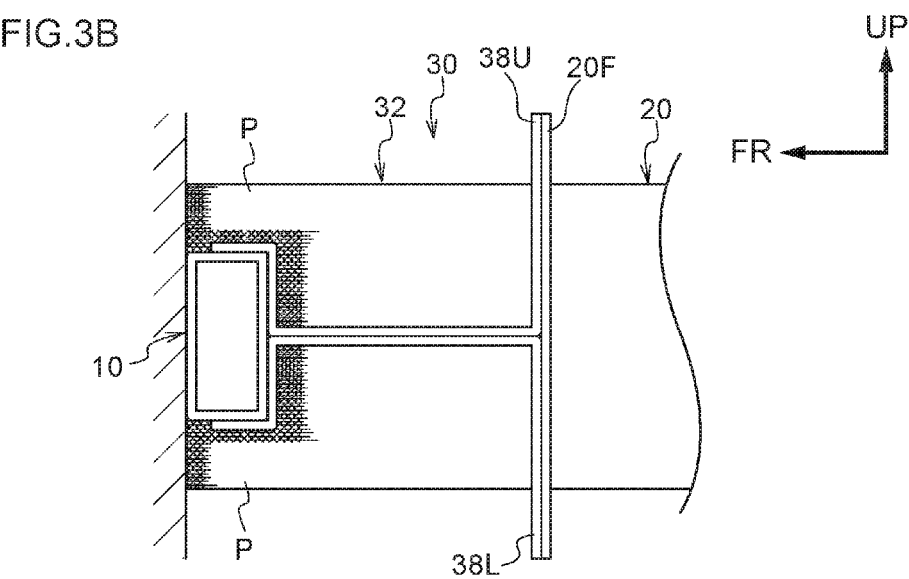

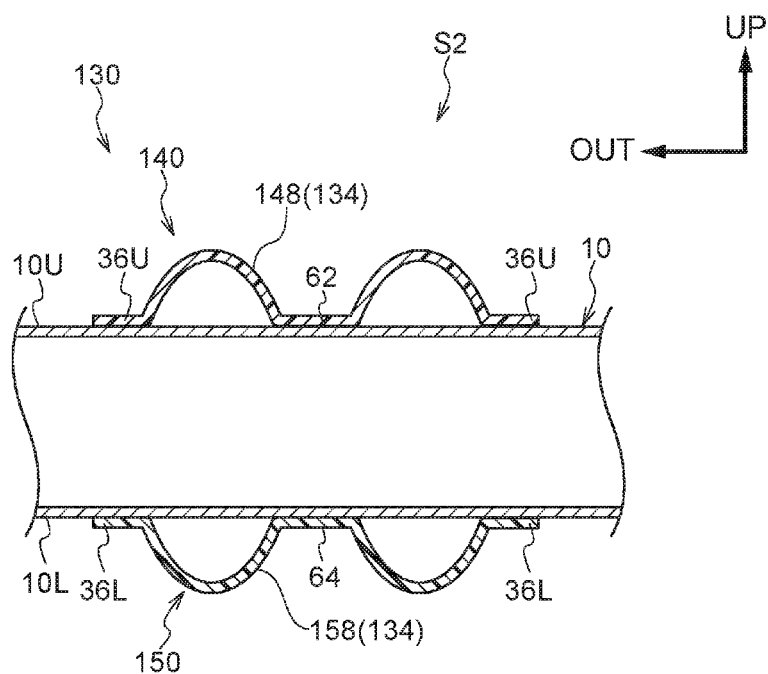
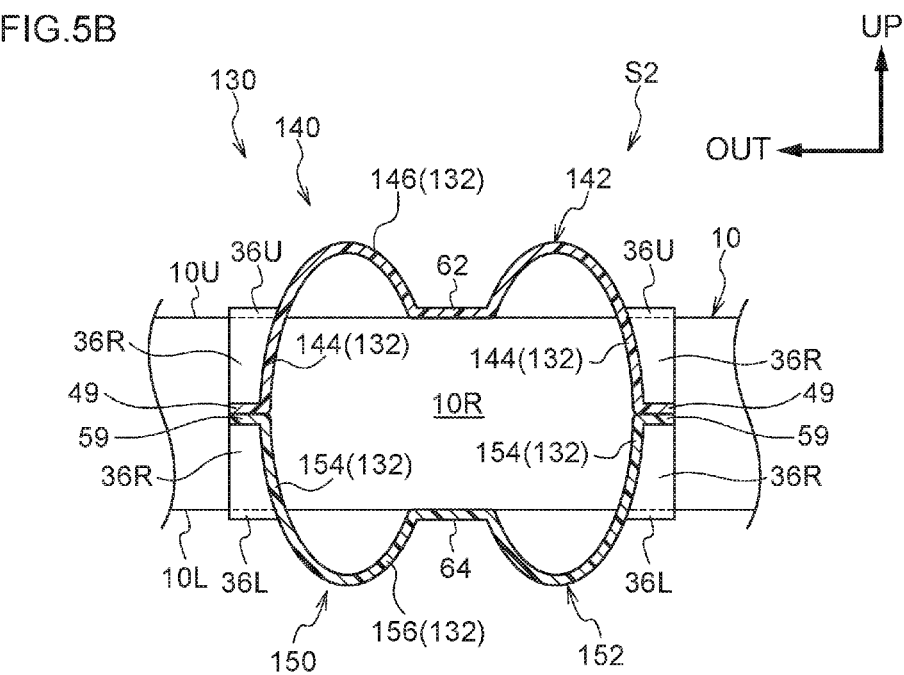

ENERGY ABSORBING STRUCTURE OF VEHICLE

CROSS-REFERENCE TO RELATED APPLICATION

This application claims priority under 35 USC 119 from Japanese Patent Application No. 2016-137842 filed Jul. 12, 2016, the disclosure of which is incorporated by reference herein.

BACKGROUND

Technical Field

The present invention relates to an energy absorbing structure of a vehicle.

Related Art

Japanese Patent Application Laid-Open (JP-A) No. 2015-196463 discloses an energy absorbing structure of a vehicle that is equipped with a crash box that is made of a fiber-reinforced resin and that is joined to a bumper reinforcement (hereinafter abbreviated as "bumper RF"). In this energy absorbing structure, a guide member is provided at the bumper RF in order to suppress positional offset between the bumper RF and the crash box in a case in which the joining of the both is cancelled due to a collision.

In a vehicle to which the above-described prior art technique is applied, when the crash box is crushed at the time of a collision, there is the concern that the portion thereof that is crushed (the crushed portion) will enter-in between the guide member and the portion of the crash box which portion has not been crushed at that point in time, and that the portion that has not been crushed of the crash box will buckle due to the crushed portion that has entered-in. If buckling arises, a stable energy absorbing characteristic by the crash box cannot be obtained.

Further, there is also the problem of increased weight of the vehicle because the guide member is provided at the bumper RF.

SUMMARY

In view of the above-described circumstances, the present invention provides, in an energy absorbing structure of a vehicle that is equipped with a crash box made of a fiber-reinforced resin, an energy absorbing structure of a vehicle that can obtain a stable energy absorbing characteristic even if a guide member is not provided at a bumper reinforcement.

An energy absorbing structure of a vehicle of a first aspect of the present invention has: a bumper reinforcement positioned at a vehicle front end portion or a vehicle rear end portion, the bumper reinforcement extending in a vehicle transverse direction; and a crash box made of a fiber-reinforced resin, the crash box being disposed at a side opposite a side of input of collision load to the bumper reinforcement, and the crash box being structured to include a crash box main body having a closed cross-sectional structure, wherein an upper portion and a lower portion of the crash box main body do not overlap the bumper reinforcement as seen from a vehicle longitudinal direction.

In the first aspect, the bumper RF is positioned at the vehicle front end portion or the vehicle rear end portion, and extends in the vehicle transverse direction. The crash box that is made of a fiber-reinforced resin is structured to include the crash box main body that has a closed cross-sectional structure. The crash box main body is disposed at the side opposite the side of input of collision load to the bumper RF.

Therefore, when collision load is inputted to the bumper RF, compressive load from the bumper RF is applied to the crash box main body that is disposed at the side opposite the side of input of the collision load, and the crash box main body is crushed by this compressive load. Due thereto, collision energy is absorbed.

Note that the above-described "side of input of collision load to the bumper reinforcement" means the vehicle front side in a case in which the bumper RF is a front bumper RF, and means the vehicle rear side in the case of a rear bumper RF. Further, the above-described "side opposite the side of input of collision load to the bumper reinforcement" means the vehicle rear side in a case in which the bumper RF is a front bumper RF, and means the vehicle front side in the case of a rear bumper RF.

Moreover, in the first aspect, as seen from the vehicle longitudinal direction, the upper portion and the lower portion of the crash box main body do not overlap the bumper RF.

Therefore, what receives compressive load from the bumper RF and is crushed at the time when collision load is inputted to the bumper RF is, of the crash box main body, mainly the portion that overlaps the bumper RF as seen from the vehicle longitudinal direction, i.e., the vehicle vertical direction intermediate portion of the crash box main body. On the other hand, the upper portion and the lower portion of the crash box main body remain without crushing due to compressive load from the bumper RF occurring thereat, and enter into a state of biting-into the bumper RF from the vehicle vertical direction. Because the crash box main body enters into a state of biting-into the bumper RF from the vehicle vertical direction in this way, positional offset of the bumper RF in the vehicle vertical direction with respect to the crash box main body (hereinafter simply called "positional offset in the vehicle vertical direction") is suppressed.

As described above, positional offset of the bumper RF in the vehicle vertical direction with respect to the crash box main body can be suppressed without providing a guide member at the bumper RF. Therefore, a stable energy absorbing characteristic can be obtained without buckling of the crash box main body, that is caused by a guide member, arising.

In an energy absorbing structure of a vehicle of a second aspect of the present invention, in the first aspect, a concave portion is provided at at least one of the upper portion or the lower portion of the crash box main body, the concave portion being recessed toward a central side of a cross-section of the crash box main body, and the concave portion extending in the vehicle longitudinal direction.

As described above, in the midst of crushing of the crash box main body due to compressive load from the bumper RF, the portions, that are not crushed by compressive load from the bumper RF, of the crash box main body, i.e., the upper portion and the lower portion of the crash box main body, work to suppress positional offset in the vehicle vertical direction. Here, in the second aspect, a concave portion is provided at at least one of the upper portion and the lower portion of the crash box main body. The concave portion is recessed toward the central side of the cross-section of the crash box main body, and extends in the vehicle longitudinal direction.

Therefore, the rigidity of at least one of the upper portion and the lower portion of the crash box main body, that work to suppress positional offset in the vehicle vertical direction, i.e., the rigidity with respect to bending in the vehicle vertical direction, is improved. Accordingly, positional offset in the vehicle vertical direction can be suppressed efficiently.

In an energy absorbing structure of a vehicle of a third aspect of the present invention, in the second aspect, the concave portions are provided at both the upper portion and the lower portion of the crash box main body.

In the third aspect, the rigidity of both the upper portion and the lower portion of the crash box main body, that work to suppress positional offset in the vehicle vertical direction, i.e., the rigidity with respect to bending in the vehicle vertical direction, is improved. Accordingly, positional offset in the vehicle vertical direction can be suppressed more efficiently.

In an energy absorbing structure of a vehicle of a fourth aspect of the present invention, in the third aspect, an upper side extending portion and a lower side extending portion extend from bumper reinforcement side end portions of an upper side protruding portion and a lower side protruding portion, which are portions of the crash box main body that jut-out toward a vehicle upper side and a vehicle lower side from the bumper reinforcement, as seen from the vehicle longitudinal direction, the upper side extending portion and the lower side extending portion are disposed at a vehicle upper side and a vehicle lower side of the bumper reinforcement, and the concave portions extend to both the upper side extending portion and the lower side extending portion.

In the fourth aspect, the upper side extending portion and the lower side extending portion extend from the bumper RF side end portions of the upper side protruding portion and the lower side protruding portion, which are portions of the crash box main body that jut-out toward the vehicle upper side and the vehicle lower side from the bumper RF, as seen from the vehicle longitudinal direction. The upper side extending portion and the lower side extending portion are disposed at the vehicle upper side and the vehicle lower side of the bumper RF. Moreover, the concave portions, that are provided at both the upper portion and the lower portion of the crash box main body, extend to both the upper side extending portion and the lower side extending portion.

Namely, the concave portions, that are recessed toward the central side of the cross-section of the crash box main body, are disposed at the vehicle upper side and the vehicle lower side of the bumper RF from a stage before a collision occurs. Therefore, the concave portions being crushed by compressive load from the bumper RF is suppressed.

In an energy absorbing structure of a vehicle of a fifth aspect of the present invention, in the fourth aspect, the concave portions contact both an upper surface and a lower surface of the bumper reinforcement.

In the fifth aspect, the concave portions, that extend to both the upper side extending portion and the lower side extending portion, contact both the upper surface and the lower surface of the bumper RF.
Therefore, even in the midst of crushing of the crash box main body, it is easy for the concave portions to contact the bumper RF from the vehicle vertical direction. Accordingly, positional offset in the vehicle vertical direction can be suppressed even more efficiently.

In an energy absorbing structure of a vehicle of a sixth aspect of the present invention, in any one of the first through fifth aspects, the crash box is structured to further include joining portions that are formed integrally with the crash box main body and that are joined to the bumper reinforcement, the joining portions being structured to include: front joining portions extending out toward outer sides of a cross-section of the crash box main body from bumper reinforcement side end portions of overlapping portions, which are portions of the crash box main body that overlap the bumper reinforcement as seen from the vehicle longitudinal direction, the front joining portions being joined to a surface at the side opposite the side of input of collision load to the bumper reinforcement, upper joining portions extending out from upper ends of the front joining portions, the upper joining portions being joined to an upper surface of the bumper reinforcement, and lower joining portions extending out from lower ends of the front joining portions, the lower joining portions being joined to a lower surface of the bumper reinforcement; an upper side extending portion and a lower side extending portion extend from bumper reinforcement side end portions of an upper side protruding portion and a lower side protruding portion, which are portions of the crash box main body that jut-out toward a vehicle upper side and a vehicle lower side from the bumper reinforcement, as seen from the vehicle longitudinal direction; the upper side extending portion and the lower side extending portion are disposed at a vehicle upper side and a vehicle lower side of the bumper reinforcement; the upper joining portions and the upper side extending portion are connected; and the lower joining portions and the lower side extending portion are connected.

In the sixth aspect, the crash box is structured to further include joining portions that are formed integrally with the crash box main body. The joining portions are joined to the bumper RF. Therefore, there is no need to provided a separate member for joining the bumper RF and the crash box between the both.

The joining portions are structured to include the front joining portions that extend out toward outer sides of the cross-section of the crash box main body from the bumper RF side end portions of the overlapping portions, which are portions of the crash box main body that overlap the bumper RF as seen from the vehicle longitudinal direction, the upper joining portions that extend out from the upper ends of the front joining portions, and the lower joining portions that extend out from the lower ends of the front joining portions. Further, the front joining portions are joined to the surface, that is at the side opposite the side of input of collision load, of the bumper RF. The upper joining portions are joined to the upper surface of the bumper RF, and the lower joining portions are joined to the lower surface of the bumper RF. Therefore, the joining strength of the bumper RF and the crash box is high.

Moreover, the upper side extending portion and the lower side extending portion, that are disposed at the vehicle upper side and the vehicle lower side of the bumper RF, extend from the bumper RF side end portions of the upper side protruding portion and the lower side protruding portion of the crash box main body. The upper joining portions and the upper side extending portion are connected, and the lower joining portions and the lower side extending portion are connected.

In a case in which tensile load is inputted to the bumper RF at the time of towing of the vehicle or the like, the crash box main body has the role of transmitting this tensile load to a member (e.g., a front side member) at the vehicle passenger compartment side. In accordance with the above-described structure, tensile load that is inputted to the bumper RF can be transmitted efficiently to the crash box main body via the joining portions.

BRIEF DESCRIPTION OF THE DRAWINGS

Exemplary embodiments of the present invention will be described in detail based on the following figures, wherein:

FIG. 3A is a side view showing a state immediately before a front collision occurs with respect to a vehicle to which the vehicle front portion structure of FIG. 1 is applied;

FIG. 3B is a side view showing a state in the midst of occurrence of a front collision and crushing of the crash box main body;

FIG. 5A is a cross-sectional view showing a state in which the vehicle front portion structure of FIG. 4 is cut at the position of the bumper RF in a plane that is orthogonal to the vehicle longitudinal direction; and FIG. 5B is a cross-sectional view showing a state in which the vehicle front portion structure of FIG. 4 is cut at the position of a crash box main body in a plane that is orthogonal to the vehicle longitudinal direction.

DETAILED DESCRIPTION

Hereinafter, an energy absorbing structure S1 of a vehicle relating to a first embodiment of the present invention is described by using FIG. 1 through FIG. 3B. The energy absorbing structure S1 of a vehicle is applied to a vehicle front portion structure. Note that arrow FR, arrow UP, arrow OUT that are marked in the respective drawings indicate the forward direction (the advancing direction), the upward direction, and a vehicle transverse direction outer side of the vehicle, respectively. Hereinafter, when merely longitudinal, left-right and vertical directions are used, they refer to the longitudinal of the longitudinal direction of the vehicle, the left and right of the left-right direction of the vehicle (the vehicle transverse direction), and the vertical of the vehicle vertical direction, unless indicated otherwise.

Note that, in the respective drawings, only the portion that is at the vehicle transverse direction left side of the energy absorbing structure S1 of a vehicle is illustrated, but the vehicle transverse direction right side portion of the energy absorbing structure S1 of a vehicle is structured similarly, i.e., is a structure in which the left and right are reversed. Therefore, in the following description, only the structure of the vehicle transverse direction left side portion of the energy absorbing structure S1 of a vehicle is described, and description of the structure of the vehicle transverse direction right side portion is omitted.

[Bumper RF]

A bumper RF 10 is positioned at the front end portion of the vehicle, and extends in the vehicle transverse direction. A bumper cover (not illustrated), that is an outer plate member of the vehicle front portion, is disposed at the vehicle front side of the bumper RF 10. The bumper RF 10 is a closed cross-sectional structure at which the cross-sectional shape, that is orthogonal to the length direction thereof, is a rectangle whose length direction is the vehicle vertical direction. The bumper RF 10 has an upper surface 10U that faces upward, a lower surface 10L that faces downward, a rear surface 10R that faces rearward, and a front surface 10F that faces frontward. The bumper RF 10 is structured of, for example, a metal material such as aluminum or iron or the like, or of a fiber-reinforced resin such as a carbon fiber-reinforced resin or the like.

[Crash Box]

A crash box 30 is joined to the vehicle rear side and a vicinity of the end portion at the vehicle transverse direction outer side of the bumper RF 10. The crash box 30 is structured of a carbon fiber-reinforced resin (hereinafter called "CFRP") or a glass fiber-reinforced resin that serves as a "fiber-reinforced resin".

The crash box 30 is structured by an upper side member 40 that structures the vehicle upper side portion thereof, and a lower side member 50 that structures the vehicle lower side portion thereof. The upper side member 40 and the lower side member 50 are structures that are symmetrical vertically.

Figure 1:
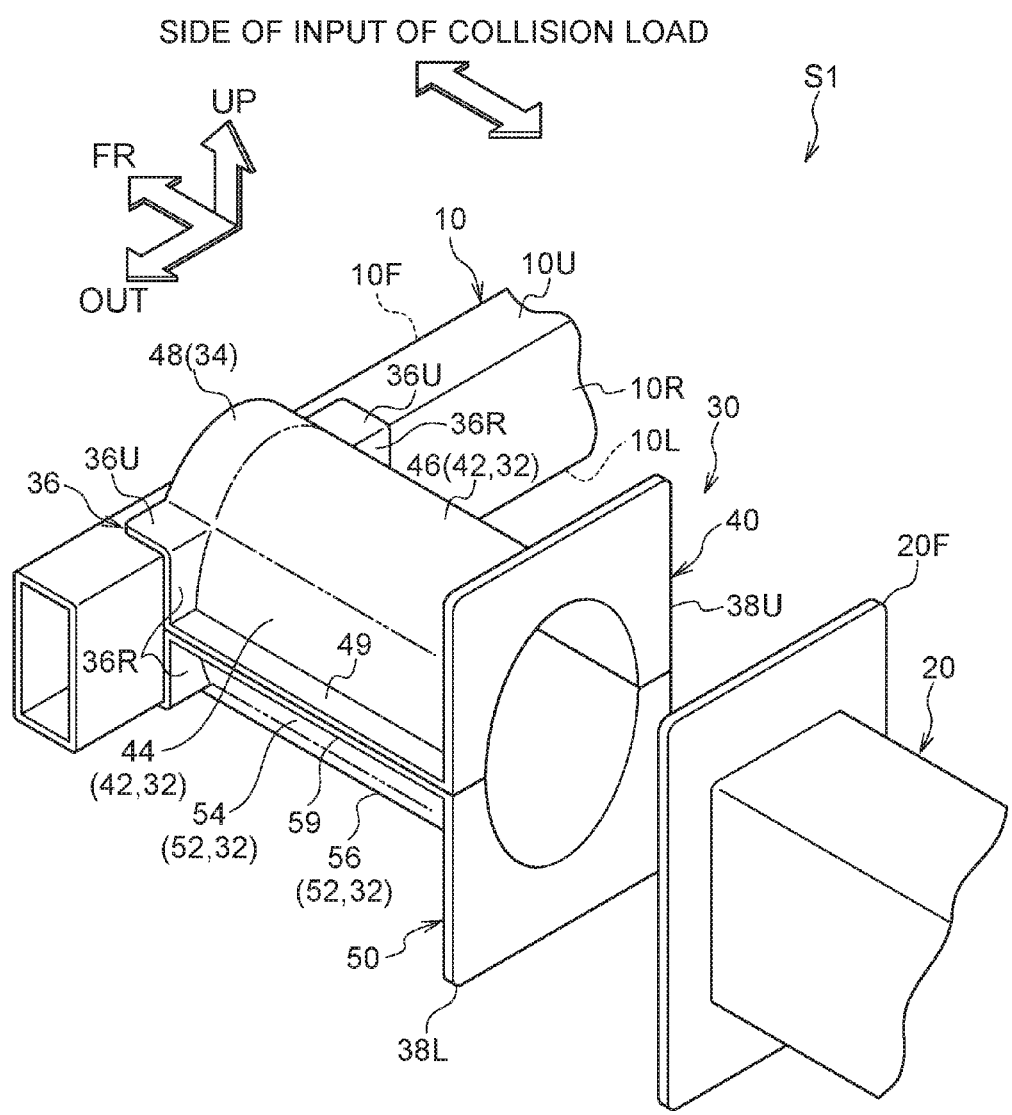
FIG. 1 is an exploded perspective view in which a vehicle front portion structure, to which an energy absorbing structure of a vehicle relating to a first embodiment is applied, is viewed from a vehicle obliquely rear side.
Figure 2A:
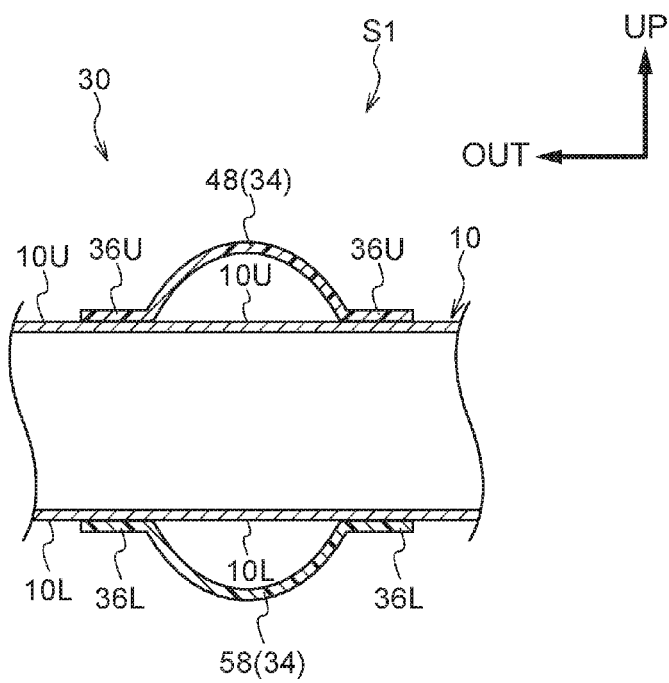
FIG. 2A is a cross-sectional view showing a state in which the vehicle front portion structure of FIG. 1 is cut at the position of a bumper RF in a plane that is orthogonal to the vehicle longitudinal direction.
Figure 2B:
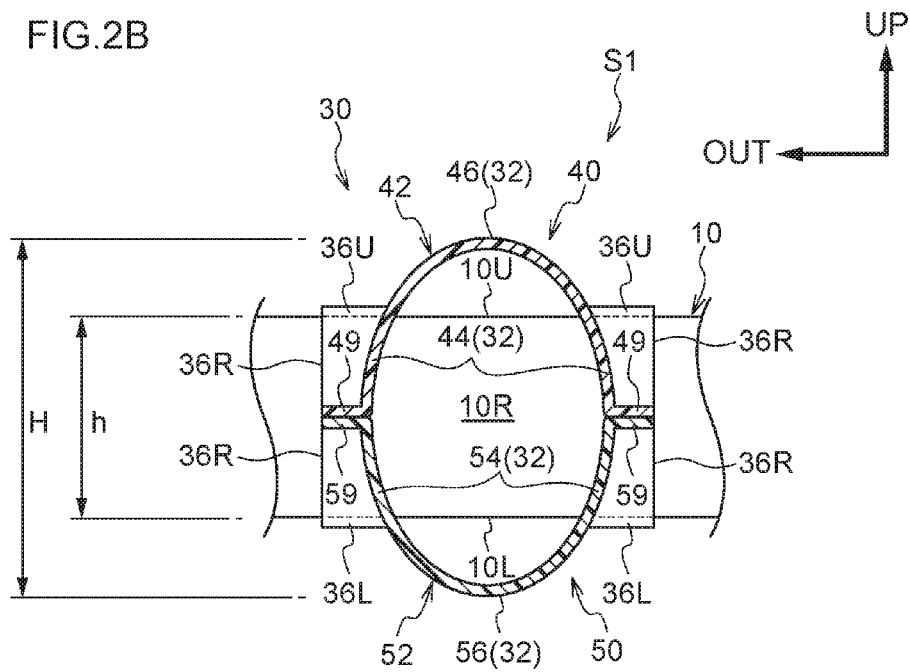
FIG. 2B is a cross-sectional view showing a state in which the vehicle front portion structure of FIG. 1 is cut at the position of a crash box main body in a plane that is orthogonal to the vehicle longitudinal direction.

As shown in FIG. 1 and FIG. 2B, the upper side member 40 is structured to include an upper side main body portion 42. The upper side main body portion 42 is a portion at which the cross-sectional shape orthogonal to the crash box axial direction (coinciding with the vehicle longitudinal direction in the present embodiment) is a half-oval shape that opens downward (i.e., a shape that is the upper half of an oval). A pair of left and right upper side joining flanges 49 extend out toward the outer sides of the cross-section from the left and right lower ends of the upper side main body portion 42. The upper side main body portion 42 and the upper side joining flanges 49 extend in the crash box axial direction at substantially the entire region between the bumper RF 10 and a front side member 20 that is described later.

As shown in FIG. 1 and FIG. 2B, the lower side member 50 is structured to include a lower side main body portion 52. The lower side main body portion 52 is a portion at which the cross-sectional shape orthogonal to the crash box axial direction is a half-oval shape that opens upward (i.e., a shape that is the lower half of an oval). A pair of left and right lower side joining flanges 59 extend out toward the outer sides of the cross-section from the left and right upper ends of the lower side main body portion 52. The lower side main body portion 52 and the lower side joining flanges 59 extend in the crash box axial direction at substantially the entire region between the bumper RF 10 and the front side member 20.

The upper side joining flanges 49 of the upper side member 40 and the lower side joining flanges 59 of the lower side member 50 are joined together. Note that a form of joining such as, for example, adhesion by an adhesive, fastening by bolts and nuts, welding, or the like is employed as the form of joining. Due thereto, as shown in FIG. 2B, a closed cross-sectional structure, at which the cross-sectional shape orthogonal to the crash box axial direction is a closed cross-sectional shape (in the present embodiment, an oval shape that is long in the vehicle vertical direction), is formed by the upper side main body portion 42 and the lower side main body portion 52. A portion 32 (hereinafter called "crash box main body 32"), that is the closed cross-sectional structure formed by the upper side main body portion 42 and the lower side main body portion 52, corresponds to the "crash box main body" of the present invention.

As shown in FIG. 2B, a dimension H of the crash box main body 32 in the vehicle vertical direction is formed so as to be larger than a dimension h of the bumper RF 10 in the vehicle vertical direction. Moreover, the position at which the bumper RF 10 is disposed in the vehicle vertical direction coincides with the vehicle vertical direction intermediate portion of the crash box main body 32. Accordingly, as seen from the vehicle longitudinal direction, the upper portion and the lower portion of the crash box main body 32 do not overlap the bumper RF 10. In other words, the crash box main body 32 is structured to include portions 44, 54 (hereinafter called "overlapping portions 44, 54"), that, of the crash box main body 32, overlap the bumper RF 10 as seen from the vehicle longitudinal direction, and portions 46, 56 (hereinafter called "protruding portions 46, 56"), that do not overlap the bumper RF 10 as seen from the vehicle longitudinal direction (refer to FIG. 3A as well). Note that the protruding portions 46, 56 can also be called portions of the crash box main body 32 that jut-out toward the vehicle upper side and the vehicle lower side from the bumper RF 10 as seen from the vehicle longitudinal direction.

Among the protruding portions 46, 56, the portion 46 (hereinafter called "upper side protruding portion 46") that structures a portion of the upper side member 40 extends toward the vehicle front side while the cross-sectional shape thereof is maintained. Hereinafter, the portion that is provided so as to extend is called an upper side extending portion 48. The upper side extending portion 48 is formed in an arch shape that is curved so as to be convex toward the vehicle upper side, and is disposed at the vehicle upper side of the upper surface 10U of the bumper RF 10. Note that the upper side protruding portion 46 also can be said to be an arch shape that is curved so as to be convex toward the vehicle upper side.

Among the protruding portions 46, 56, the portion 56 (hereinafter called "lower side protruding portion 56") that structures a portion of the lower side member 50 extends toward the vehicle front side while the cross-sectional shape thereof is maintained. Hereinafter, the portion that is provided so as to extend is called a lower side extending portion 58. The lower side extending portion 58 is formed in an arch shape that is curved so as to be convex toward the vehicle lower side, and is disposed at the vehicle lower side of the lower surface 10L of the bumper RF 10. Note that the lower side protruding portion 56 also can be said to be an arch shape that is curved so as to be convex toward the vehicle lower side.

Note that there are cases in which the upper side extending portion 48 and the lower side extending portion 58 are together called extending portion 34.

Front flanges 36R that serve as "front joining portions" extend out toward the outer sides of the cross-section of the crash box main body 32 from the front ends of, among the overlapping portions 44, 54, the portions 44 (hereinafter called the "upper side overlapping portions 44") that structure portions of the upper side member 40. Concretely, because the upper side overlapping portions 44 exist as a pair and are separated in the vehicle transverse direction, the front flange 36R at the vehicle transverse direction outer side extends out toward the vehicle transverse direction outer side from the front end of the upper side overlapping portion 44 that is at the vehicle transverse direction outer side, and the front flange 36R at the vehicle transverse direction inner side extends out toward the vehicle transverse direction inner side from the front end of the upper side overlapping portion 44 that is at the vehicle transverse direction inner side. The front flanges 36R are formed in the shapes of flat plates whose plate thickness direction is substantially the vehicle longitudinal direction, and are joined to the rear surface 10R of the bumper RF 10. Note that a form of joining such as, for example, adhesion by an adhesive, fastening by bolts and nuts, welding, or the like is employed as the form of joining.

The front flanges 36R that serve as "front joining portions" extend out toward the outer sides of the cross-section of the crash box main body 32 from the front ends of, among the overlapping portions 44, 54, the portions 54 (hereinafter called the "lower side overlapping portions 54") that structure portions of the lower side member 50. Concretely, because the lower side overlapping portions 54 exist as a pair and are separated in the vehicle transverse direction, the front flange 36R at the vehicle transverse direction outer side extends out toward the vehicle transverse direction outer side from the front end of the lower side overlapping portion 54 that is at the vehicle transverse direction outer side, and the front flange 36R at the vehicle transvers direction inner side extends out toward the vehicle transverse direction inner side from the front end of the lower side overlapping portion 54 that is at the vehicle transverse direction inner side. The front flanges 36R are formed in the shapes of flat plates whose plate thickness direction is substantially the vehicle longitudinal direction, and are joined to the rear surface 10R of the bumper RF 10. Note that a form of joining such as, for example, adhesion by an adhesive, fastening by bolts and nuts, welding, or the like is employed as the form of joining.

Upper flanges 36U that serve as "upper joining portions" extend out forward from the upper ends of the front flanges 36R of the upper side member 40. Concretely, because the front flanges 36R of the upper side member 40 exist as a pair and are separated in the vehicle transverse direction, the upper flange 36U that is at the vehicle transverse direction outer side extends out forward from the front flange 36R that is at the vehicle transverse direction outer side, and the upper flange 36U that is at the vehicle transverse direction inner side extends out forward from the front flange 36R that is at the vehicle transverse direction inner side.

Further, as shown in FIG. 2A, the upper flanges 36U are connected to the upper side extending portion 48. Concretely, the upper flange 36U that is at the vehicle transverse direction outer side extends out toward the vehicle transverse direction outer side from the vehicle transverse direction outer side end portion of the upper side extending portion 48, and the upper flange 36U that is at the vehicle transverse direction inner side extends out toward the vehicle transverse direction inner side from the vehicle transverse direction inner side end portion of the upper side extending portion 48. The upper flanges 36U are formed in the shapes of flat plates whose plate thickness direction is substantially the vehicle vertical direction, and are joined to the upper surface 10U of the bumper RF 10. Note that a form of joining such as, for example, adhesion by an adhesive, fastening by bolts and nuts, welding, or the like is employed as the form of joining.

Lower flanges 36L that serve as "lower joining portions" extend out forward from the lower ends of the front flanges 36R of the lower side member 50. Concretely, because the front flanges 36R of the lower side member 50 exist as a pair and are separated in the vehicle transverse direction, the lower flange 36L that is at the vehicle transverse direction outer side extends out forward from the front flange 36R that is at the vehicle transverse direction outer side, and the lower flange 36L that is at the vehicle transverse direction inner side extends out forward from the front flange 36R that is at the vehicle transverse direction inner side.

Further, as shown in FIG. 2A, the lower flanges 36L are connected to the lower side extending portion 58. Concretely, the lower flange 36L that is at the vehicle transverse direction outer side extends out toward the vehicle transverse direction outer side from the vehicle transverse direction outer side end portion of the lower side extending portion 58, and the lower flange 36L that is at the vehicle transverse direction inner side extends out toward the vehicle transverse direction inner side from the vehicle transverse direction inner side end portion of the lower side extending portion 58. The lower flanges 36L are formed in the shapes of flat plates whose plate thickness direction is substantially the vehicle vertical direction, and are joined to the lower surface 10L of the bumper RF 10. Note that a form of joining such as, for example, adhesion by an adhesive, fastening by bolts and nuts, welding, or the like is employed as the form of joining.

As shown in FIG. 1, a rear flange 38U extends out toward the outer side of the cross-section of the crash box main body 32 (in the vehicle transverse direction and toward the vehicle upper side) from the vehicle rear end of the upper side main body portion 42. Further, a rear flange 38L extends out toward the outer side of the cross-section of the crash box main body 32 (in the vehicle transverse direction and toward the vehicle lower side) from the vehicle rear end of the lower side main body portion 52. The rear flange 38U and the rear flange 38L are a rear joining portion that is joined to a front flange 20F of the front side member 20 that is a skeleton member that extends in the vehicle longitudinal direction. (Note that a state before joining is shown in FIG. 1.)

Operation/Effects

Operation and effects of the energy absorbing structure S1 of a vehicle of the first embodiment are described next.

At the energy absorbing structure S1 of a vehicle of the first embodiment, the bumper RF 10 is positioned at the vehicle front end portion and extends in the vehicle transverse direction. Further, the crash box 30 that is made of a fiber-reinforced resin is structured to include the crash box main body 32 that has a closed cross-sectional structure. The crash box main body 32 is disposed at the vehicle rear side of the bumper RF 10, i.e., at the side opposite the side of input of collision load to the bumper RF 10.

Therefore, when a collision load is inputted to the bumper RF 10 due to a front collision or the like, compressive load from the bumper RF 10 is applied to the crash box main body 32 that is disposed at the vehicle rear side of the bumper RF 10, and the crash box main body 32 is crushed by this compressive load. Due thereto, collision energy is absorbed.

Moreover, at the energy absorbing structure S1 of a vehicle of the first embodiment, the upper portion and the lower portion of the crash box main body 32 do not overlap the bumper RF 10 as seen from the vehicle longitudinal direction.

Therefore, as shown in FIG. 3B, what receives compressive load from the bumper RF 10 and is crushed at the time when a collision load is inputted to the bumper RF 10 is, of the crash box main body 32, mainly the portions (the overlapping portions 44, 54) that overlap the bumper RF 10 as seen from the vehicle longitudinal direction, i.e., the vehicle vertical direction intermediate portion of the crash box main body 32. On the other hand, basically, the upper portion and the lower portion of the crash box main body 32 remain without crushing due to compressive load from the bumper RF 10 occurring thereat, and enter into a state of biting-into the bumper RF 10 from the vehicle vertical direction. Namely, as shown in FIG. 3B, of the crash box main body 32, crushing of the vehicle vertical direction intermediate portion proceeds more rapidly than crushing of the upper portion and the lower portion in the vehicle vertical direction, and, due thereto, biting-in portions (the portions indicated by letters P in the drawing) for suppressing positional offset in the vehicle vertical direction are gradually generated. Because the crash box main body 32 enters into a state of biting-into the bumper RF 10 from the vehicle vertical direction in this way, positional offset of the bumper RF 10 in the vehicle vertical direction with respect to the crash box main body 32 (hereinafter simply called "positional offset in the vehicle vertical direction") is suppressed.

As described above, in accordance with the energy absorbing structure S1 of a vehicle of the first embodiment, positional offset in the vehicle vertical direction can be suppressed without providing a guide member at the bumper RF 10. Therefore, a stable energy absorbing characteristic can be obtained without buckling of the crash box main body 32, that is caused by a guide member, arising.

Further, in the energy absorbing structure S1 of a vehicle of the first embodiment, the crash box 30 is structured to further include the front flanges 36R, the upper flanges 36U and the lower flanges 36L that serve as "joining portions" and that are formed integrally with the crash box main body 32. These joining portions are joined to the bumper RF 10. Therefore, there is no need to provide, between the bumper RF 10 and the crash box 30, a separate member for joining the both.

Further, the front flanges 36R are joined to the surface of the bumper RF 10 (the rear surface 10R), which surface is at the side opposite the side of input of the collision load. The upper flanges 36U are joined to the upper surface 10U of the bumper RF 10, and the lower flanges 36L are joined to the lower surface 10L of the bumper RF 10. Therefore, the joining strength of the bumper RF 10 and the crash box 30 is high.

Moreover, the upper side extending portion 48 and the lower side extending portion 58, that are disposed at the vehicle upper side and the vehicle lower side of the bumper RF 10, are provided so as to extend from the bumper RF 10 side end portions of the upper side protruding portion 46 and the lower side protruding portion 56 of the crash box main body 32. Further, the upper flanges 36U and the upper side extending portion 48 are connected, and the lower flanges 36L and the lower side extending portion 58 are connected. In a case in which tensile load (load in the direction opposite the collision load) is inputted to the bumper RF 10 at the time of towing of the vehicle or the like, the crash box main body 32 has the role of transmitting this tensile load to a member (the front side member 20) at the vehicle passenger compartment side. In accordance with the above-described structure, tensile load that is inputted to the bumper RF 10 can be transmitted efficiently to the crash box main body 32 via the joining portions 36. Namely, tensile load from the bumper RF 10 can be transmitted efficiently to the crash box main body 32 that works to transmit tensile load, that is inputted to the bumper RF 10 at the time of towing of the vehicle or the like, to a member (the front side member 20) at the vehicle passenger compartment side.

Second Embodiment

An energy absorbing structure S2 of a vehicle relating to a second embodiment of the present invention is described next. The energy absorbing structure S2 is applied to a vehicle front portion structure. Note that structural portions that are the same as those of the above-described first embodiment are denoted by the same reference numerals, and description thereof is omitted.

Figure 4:
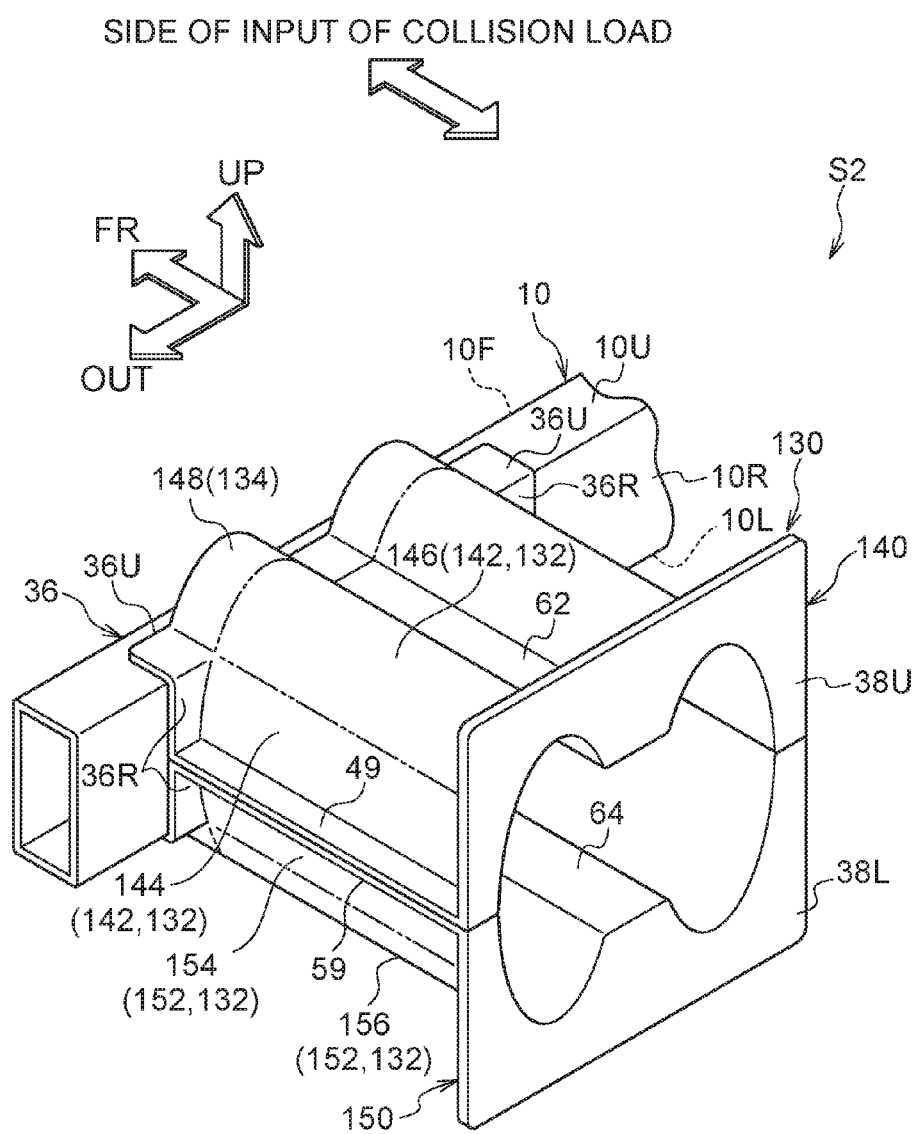
FIG. 4 is a perspective view in which a vehicle front portion structure, to which an energy absorbing structure of a vehicle relating to a second embodiment is applied, is viewed from a vehicle obliquely rear side.

The energy absorbing structure S2 of a vehicle relating to the second embodiment is shown in FIG. 4, FIG. 5A and FIG. 5B.

In the second embodiment, the structures of the bumper RF 10 and the front side member 20 (not illustrated in FIG. 4) are substantially the same as in the first embodiment. Further, a crash box 130 is similar to the first embodiment with regard to the point of being structured to include a crash box main body 132, that is formed from overlapping portions 144, 154 and protruding portions 146, 156, and an extending portion 134, the front flanges 36R, the upper flanges 36U, the lower flanges 36L, and the rear flanges 38U, 38L.

On the other hand, the concrete structures of the crash box main body 132 and the extending portion 134, i.e., the point that concave portions 62, 64 are formed in the crash box main body 132 and the extending portion 134, differs from the first embodiment. Note that the width in the vehicle transverse direction of the crash box 130 that is shown in FIG. 4 is larger than that of the crash box 30 shown in FIG. 1.

The crash box 130, and the crash box main body 132 and the extending portion 134 in particular, are described hereinafter.

The crash box 130 is structured by an upper side member 140 that structures the vehicle upper side portion thereof, and a lower side member 150 that structures the vehicle lower side portion thereof. The upper side member 140 and the lower side member 150 are structures that are symmetrical vertically.

Further, the upper side joining flanges 49 of the upper side member 140 and the lower side joining flanges 59 of the lower side member 150 are joined together. Due thereto, as shown in FIG. 5B, a closed cross-sectional structure, at which the cross-sectional shape orthogonal to the crash box axial direction is a closed cross-sectional shape, is formed by an upper side main body portion 142 and a lower side main body portion 152. The portion 132 (hereinafter called the "crash box main body 132"), that is the closed cross-sectional structure formed by the upper side main body portion 142 and the lower side main body portion 152, corresponds to the "crash box main body" of the present invention.

The upper side concave portion 62, that is recessed toward the central side (the lower side) of the cross-section of the crash box main body 132, is formed at the upper portion of the upper side main body portion 142. On the other hand, the lower side concave portion 64, that is recessed toward the central side (the upper side) of the cross-section of the crash box main body 132, is formed at the lower portion of the lower side main body portion 152. The upper side concave portion 62 and the lower side concave portion 64 (that together are simply called the "concave portions 62, 64" upon occasion hereinafter) are formed so as to be continuous in the axial direction of the crash box (that coincides with the vehicle longitudinal direction in the present embodiment).

The concave portions 62, 64 are made to be flat plate shapes whose plate thickness direction faces substantially in the vehicle vertical direction. Further, the concave portions 62, 64 are disposed at positions that do not overlap the bumper RF 10 as seen from the vehicle longitudinal direction. In other words, the concave portions 62, 64 structure portions of the protruding portions 146, 156 of the crash box main body 132. Due thereto, the upper side protruding portion 146 is structured from the upper side concave portion 62, that is flat-plate-shaped and is positioned at the vehicle transverse direction intermediate portion thereof, and arch-shaped portions that are curved so as to be convex toward the vehicle upper side and are positioned at the vehicle transverse direction both sides of the upper side concave portion 62. Further, the lower side protruding portion 156 is structured from the lower side concave portion 64, that is flat-plate-shaped and is positioned at the vehicle transverse direction intermediate portion thereof, and arch-shaped portions that are curved so as to be convex toward the vehicle lower side and are positioned at the vehicle transverse direction both sides of the lower side concave portion 64.

Further, the upper side protruding portion 146 extends toward the vehicle front side while the cross-sectional shape thereof is maintained. The lower side protruding portion 156 extends toward the vehicle front side while the cross-sectional shape thereof is maintained. Hereinafter, these portions that are extended are called an upper side extending portion 148 and a lower side extending portion 158. Further, there are cases in which the upper side extending portion 148 and the lower side extending portion 158 are together called the extending portion 134. Due thereto, the upper side extending portion 148 is structured from the upper side concave portion 62, that is flat-plate-shaped and is positioned at the vehicle transverse direction intermediate portion thereof, and arch-shaped portions that are curved so as to be convex toward the vehicle upper side and are positioned at the vehicle transverse direction both sides of the upper side concave portion 62. Further, the lower side extending portion 158 is structured from the lower side concave portion 64, that is flat-plate-shaped and is positioned at the vehicle transverse direction intermediate portion thereof, and arch-shaped portions that are curved so as to be convex toward the vehicle lower side and are positioned at the vehicle transverse direction both sides of the lower side concave portion 64.

Further, as shown in FIG. 5A, the upper side concave portion 62 and the lower side concave portion 64, that are provided so as to extend to both the upper side extending portion 148 and the lower side extending portion 158, are connected to the upper surface 10U and the lower surface 10L of the bumper RF 10, respectively.

Operation/Effects

Operation and effects of the second embodiment are described next.

As described in the first embodiment, in the midst of crushing of the crash box main body 32 due to compressive load from the bumper RF 10, the portions, that are not crushed by compressive load from the bumper RF 10, of the crash box main body 32, i.e., the upper portion and the lower portion of the crash box main body 32, work to suppress positional offset in the vehicle vertical direction. This point is the same in the second embodiment as well.

Here, in the energy absorbing structure S2 of a vehicle relating to the second embodiment, the upper side concave portion 62, that is recessed toward the central side (the lower side) of the cross-section of the crash box main body 132, is formed at the upper portion of the upper side main body portion 142. On the other hand, the lower side concave portion 64, that is recessed toward the central side (the upper side) of the cross-section of the crash box main body 132, is formed at the lower portion of the lower side main body portion 152. Namely, the concave portions 62, 64, that are recessed toward the central side of the cross-section of the crash box main body 132, are provided at both the upper portion and the lower portion of the crash box main body 132. The concave portions 62, 64 are formed so as to be continuous in the vehicle longitudinal direction.

Therefore, the rigidity of both the upper portion and the lower portion of the crash box main body, that work to suppress positional offset in the vehicle vertical direction, i.e., the rigidity with respect to bending in the vehicle vertical direction, is improved. Accordingly, positional offset in the vehicle vertical direction can be suppressed efficiently.

Further, in the energy absorbing structure S2 of a vehicle relating to the second embodiment, the upper side extending portion 148 and the lower side extending portion 158 are provided so as to extend from the bumper RF 10 side end portions of the upper side protruding portion 146 and the lower side protruding portion 156 that, of the crash box main body 132, are the portions that jut-out toward the vehicle upper side and lower side of the bumper RF 10 as seen from the vehicle longitudinal direction. The upper side extending portion 148 and the lower side extending portion 158 are disposed at the vehicle upper side and the vehicle lower side of the bumper RF 10. Moreover, the concave portions 62, 64, that are provided at both the upper portion and the lower portion of the crash box main body 132, are provided so as to extend to both the upper side extending portion 148 and the lower side extending portion 158.

Namely, the concave portions 62, 64, that are recessed toward the central side of the cross-section of the crash box main body 132, are disposed at the vehicle upper side and the vehicle lower side of the bumper RF 10 from the stage before a collision occurs. Therefore, the concave portions 62, 64 being crushed by compressive load from the bumper RF 10 is suppressed.

Further, in the energy absorbing structure S2 of a vehicle relating to the second embodiment, the concave portions 62, 64, that are provided so as to extend to both the upper side extending portion 148 and the lower side extending portion 158, contact both the upper surface 10U and the lower surface 10L of the bumper RF 10.

Therefore, even in the midst of crushing of the crash box main body 132, it is easy for the concave portions 62, 64 to contact the bumper RF 10 from the vehicle vertical direction. Accordingly, positional offset in the vehicle vertical direction can be suppressed more efficiently.

[Supplementary Description of Above-Described Embodiments]

Note that the first embodiment and the second embodiment describe examples in which the crash box 30, 130 is structured by the upper side member 40, 140 and the lower side member 50, 150, and the both are joined by the joining flanges. However, the present invention is not limited to this. For example, the crash box may be structured by a right side member and a left side member that structure the left and right portions thereof, and may be formed by these both members being joined together. As another example, the crash box may be molded integrally in the resin molding stage.

Further, the first embodiment and the second embodiment describe examples in which the overlapping portions 44, 54, 144, 154 of the crash box main body 32, 132 are wall portions (refer to FIG. 2B and FIG. 5B) that curve so as to be convex in directions of moving away from the center of the cross section of the crash box main body. However, the present invention is not limited to this. Further, the protruding portions 46, 56, 146, 156 of the crash box main body 32, 132 are structured to include arch-shaped portions that are curved so as to be convex toward the vehicle upper side or the vehicle lower side, but the present invention is not limited to this.

For example, as a result of making the cross-sectional shape of the crash box main body be a rectangular shape that is long in the vehicle vertical direction, the overlapping portions are made to be flat-plate shapes whose plate thickness direction is substantially the vehicle transverse direction, and the protruding portions do not have to include portions that are arch-shaped. Further, any of various shapes can be employed provided that the cross-sectional shape of the crash box main body is a closed cross-sectional shape.

Further, the first embodiment and the second embodiment describe examples in which the crash box main body 32, 132 has the same cross-sectional shape regardless of the position in the crash box axial direction (the vehicle longitudinal direction). However, the present invention is not limited to this. For example, the crash box main body may be a shape in which the vertical direction dimension thereof gradually becomes larger while heading in the direction of moving away from the bumper RF (toward the vehicle rear side) in the crash box axial direction. Further, the crash box main body may be a shape in which the vertical direction dimension thereof gradually becomes smaller. Moreover, the cross-sectional shape may vary in accordance with the position in the crash box axial direction (the vehicle longitudinal direction).

Further, the second embodiment describes an example in which the concave portions 62, 64 are formed so as to be continuous in the crash box axial direction. However, the "concave portions" of the present invention are not limited to this. For example, portions that are slightly discontinuous may exist provided that the concave portions are provided so as to extend substantially in the vehicle longitudinal direction. Namely, the concave portions "extending substantially in the vehicle longitudinal direction" in the present disclosure means that portions that are slightly discontinuous may exist in the vehicle longitudinal direction.

Further, the second embodiment describes an example in which the concave portions 62, 64 structure portions of the protruding portions 146, 156 of the crash box main body 132, i.e., an example in which the concave portions 62, 64 are disposed at positions that do not overlap the bumper RF 10 as seen from the vehicle longitudinal direction. However, the "concave portions" of the present invention are not limited to this. For example, the portions, of the concave portions, that are near to the bumper RF (the vehicle front portions thereof) may structure portions of the protruding portions, and the portions, of the concave portions, that are far from the bumper RF (the vehicle rear portions thereof) may structure portions of the overlapping portions.

Further, although the second embodiment describes an example in which the concave portions 62, 64 of the extending portion 134 contact both the upper surface 10U and the lower surface 10L of the bumper RF 10, the "concave portions of the extending portion" of the present invention are not limited to this. For example, the concave portions of the extending portion may be disposed so as to be apart from the upper surface and/or the lower surface of the bumper RF. Further, for example, the concave portions of the extending portion may not only contact the upper surface and/or the lower surface of the bumper RF, but may be joined thereto as well.

Further, the first embodiment and the second embodiment describe examples in which a guide member, i.e., a member that is provided so as to project-out toward the vehicle rear side from the rear surface of the bumper RF 10 and that is disposed in the interior of the crash box main body 32, is not provided at the bumper RF 10. However, the present invention is not limited to this. For example, a guide member for suppressing positional offset of the bumper RF in the vehicle transverse direction with respect to the crash box main body may be provided.

Further, the first embodiment and the second embodiment illustrate examples in which the energy absorbing structure of a vehicle relating to the present invention is applied to a vehicle front portion structure, but the present invention is not limited to this. For example, the present invention may be applied to a vehicle rear portion structure in which a crash box is interposed between a rear side member and a rear bumper RF. Of course, the present invention may be applied to both a vehicle front portion structure and a vehicle rear portion structure.

What is claimed is:

1. An energy absorbing structure of a vehicle, the energy absorbing structure comprising:
   a bumper reinforcement positioned at a vehicle front end portion or a vehicle rear end portion, the bumper reinforcement extending in a vehicle transverse direction; and
   a crash box made of a fiber-reinforced resin, the crash box being disposed at a side of the bumper reinforcement opposite a side of input of collision load to the bumper reinforcement, and the crash box including a crash box main body having a closed cross-sectional structure,
   wherein a dimension of the crash box main body in a vehicle vertical direction is larger than a dimension of the bumper reinforcement in the vehicle vertical direction throughout a length of the crash box main body in the vehicle longitudinal direction from a front end to a rear end of the crash box main body so that, when seen in the vehicle longitudinal direction, an upper portion and a lower portion of the crash box main body do not overlap the bumper reinforcement.

2. The energy absorbing structure of claim 1, wherein a concave portion is provided at one or both of the upper portion and the lower portion of the crash box main body, the concave portion being recessed toward a central side of a cross-section of the crash box main body, and the concave portion extending in the vehicle longitudinal direction.

3. The energy absorbing structure of claim 2, wherein the concave portions are provided at both the upper portion and the lower portion of the crash box main body.

4. The energy absorbing structure of claim 3, wherein:
   an upper side extending portion and a lower side extending portion extend from bumper reinforcement side end portions of an upper side protruding portion and a lower side protruding portion of the crash box main body that jut-out toward a vehicle upper side and a vehicle lower side from the bumper reinforcement, as seen from the vehicle longitudinal direction,
   the upper side extending portion and the lower side extending portion are disposed at a vehicle upper side and a vehicle lower side of the bumper reinforcement, and
   the concave portions extend to both the upper side extending portion and the lower side extending portion.

5. The energy absorbing structure of claim 4, wherein the concave portions contact both an upper surface and a lower surface of the bumper reinforcement.

6. An energy absorbing structure of a vehicle, the energy absorbing structure comprising:
   a bumper reinforcement positioned at a vehicle front end portion or a vehicle rear end portion, the bumper reinforcement extending in a vehicle transverse direction; and
   a crash box made of a fiber-reinforced resin, the crash box being disposed at a side of the bumper reinforcement opposite a side of input of collision load to the bumper reinforcement, and the crash box including a crash box main body having a closed cross-sectional structure, wherein
   an upper portion and a lower portion of the crash box main body do not overlap the bumper reinforcement as seen from a vehicle longitudinal direction,
   the crash box further includes joining portions that are formed integrally with the crash box main body and that are joined to the bumper reinforcement, the joining portions including:
      front joining portions extending out toward outer sides of a cross-section of the crash box main body from bumper reinforcement side end portions of overlapping portions of the crash box main body that overlap the bumper reinforcement as seen from the vehicle longitudinal direction, the front joining portions being joined to a surface at the side opposite the side of input of the collision load to the bumper reinforcement,
      upper joining portions extending out from upper ends of the front joining portions, the upper joining portions being joined to an upper surface of the bumper reinforcement, and
      lower joining portions extending out from lower ends of the front joining portions, the lower joining portions being joined to a lower surface of the bumper reinforcement;
   an upper side extending portion and a lower side extending portion extend from bumper reinforcement side end portions of an upper side protruding portion and a lower side protruding portion of the crash box main body that jut-out toward a vehicle upper side and a vehicle lower side from the bumper reinforcement, as seen from the vehicle longitudinal direction;
   the upper side extending portion and the lower side extending portion are disposed at a vehicle upper side and a vehicle lower side of the bumper reinforcement;
   the upper joining portions and the upper side extending portion are connected; and
   the lower joining portions and the lower side extending portion are connected.

7. An energy absorbing structure of a vehicle, the energy absorbing structure comprising:
   a bumper reinforcement positioned at a vehicle front end portion or a vehicle rear end portion, the bumper reinforcement extending in a vehicle transverse direction; and
   a crash box made of a fiber-reinforced resin, the crash box being disposed at a side of the bumper reinforcement opposite a side of input of collision load to the bumper reinforcement, and the crash box including a crash box main body having a closed cross-sectional structure, wherein
   an upper portion and a lower portion of the crash box main body do not overlap the bumper reinforcement as seen from a vehicle longitudinal direction,
   one or both of an upper side extending portion and a lower side extending portion extends from a bumper reinforcement side end portion of one or both of an upper side protruding portion and a lower side protruding portion of the crash box main body that jut-out toward one or both of a vehicle upper side and a vehicle lower side from the bumper reinforcement, as seen from the vehicle longitudinal direction;

the upper side extending portion and the lower side extending portion are disposed at one or both of a vehicle upper side and a vehicle lower side of the bumper reinforcement, and one or both of the upper side extending portion and the lower side extending portion, and one or both of the upper side protruding portion and the lower side protruding portion, are arch portions that are curved so as to be convex toward one or both of the vehicle upper side and the vehicle lower side.

8. The energy absorbing structure of claim 7, wherein the arch portions are provided at both the upper portion and the lower portion of the crash box main body.

* * * * *